United States Patent
Lin et al.

(10) Patent No.: US 6,632,037 B2
(45) Date of Patent: Oct. 14, 2003

(54) KEYBOARD ASSEMBLY WITH POSITIONING FUNCTION

(75) Inventors: Winky Lin, Taipei (TW); Ren Kuo, Taipei Hsien (TW); Ken Chen, Taipei Hsien (TW)

(73) Assignee: Silitek Corporation, Taipei (TW)

( * ) Notice: Subject to any disclaimer, the term of this patent is extended or adjusted under 35 U.S.C. 154(b) by 58 days.

(21) Appl. No.: 09/933,201

(22) Filed: Aug. 21, 2001

(65) Prior Publication Data

US 2003/0039503 A1 Feb. 27, 2003

(51) Int. Cl.⁷ .................................................. B41J 5/28
(52) U.S. Cl. ........................................ 400/472; 400/496
(58) Field of Search .............................. 400/472, 496, 400/485; 341/21, 22; 361/680; 200/5 R, 52 R; 235/145 R, 145 A; 345/168, 169

(56) References Cited

U.S. PATENT DOCUMENTS

| | | | | |
|---|---|---|---|---|
| 5,788,386 A | * | 8/1998 | Hayashi et al. ............. 400/489 |
| 6,055,153 A | * | 4/2000 | Chiu et al. .................. 361/687 |
| 6,081,207 A | * | 6/2000 | Batio ........................... 341/20 |
| 6,195,839 B1 | * | 3/2001 | Patterson et al. .............. 16/334 |
| 6,370,018 B1 | * | 4/2002 | Miller et al. ................ 361/680 |
| 2002/0101405 A1 | * | 8/2002 | Chang .......................... 345/168 |

* cited by examiner

Primary Examiner—Andrew H. Hirsfeld
Assistant Examiner—Anthony H. Nguyen
(74) Attorney, Agent, or Firm—Rabin & Berdo, P.C.

(57) ABSTRACT

A keyboard assembly includes a keyboard body and an interface pivotally arranged on a pivotal axis of the keyboard body and being able to rotate laterally. The pivotal axis has an inclined angle with respect to a vertical line of the interface. The keyboard body is composed of a first panel and a second panel pivotally connected to the first panel. Each of the first panel and the second panel has a receiving space in a symmetrical arrangement to accommodate the interface.

11 Claims, 8 Drawing Sheets

KEYBOARD ASSEMBLY WITH POSITIONING FUNCTION

FIELD OF THE INVENTION

The present invention relates to a keyboard assembly with a positioning function, especially to a compact keyboard assembly for portable electronic devices such as PDAs (personal digital assistants) or cellular phones.

BACKGROUND OF THE INVENTION

Compact and portable electronic devices such as PDAs (personal digital assistants) or cellular phones are essential for mobile communication. The compact and portable electronic devices generally rely on a keyboard for inputting data.

However, there is often a connection problem between the compact keyboard and the portable electronic device. For example, the compact keyboard may be electrically connected to the cellular phone by a cable and mechanically connected to the cellular phone by a clamping device.

Figure 1:
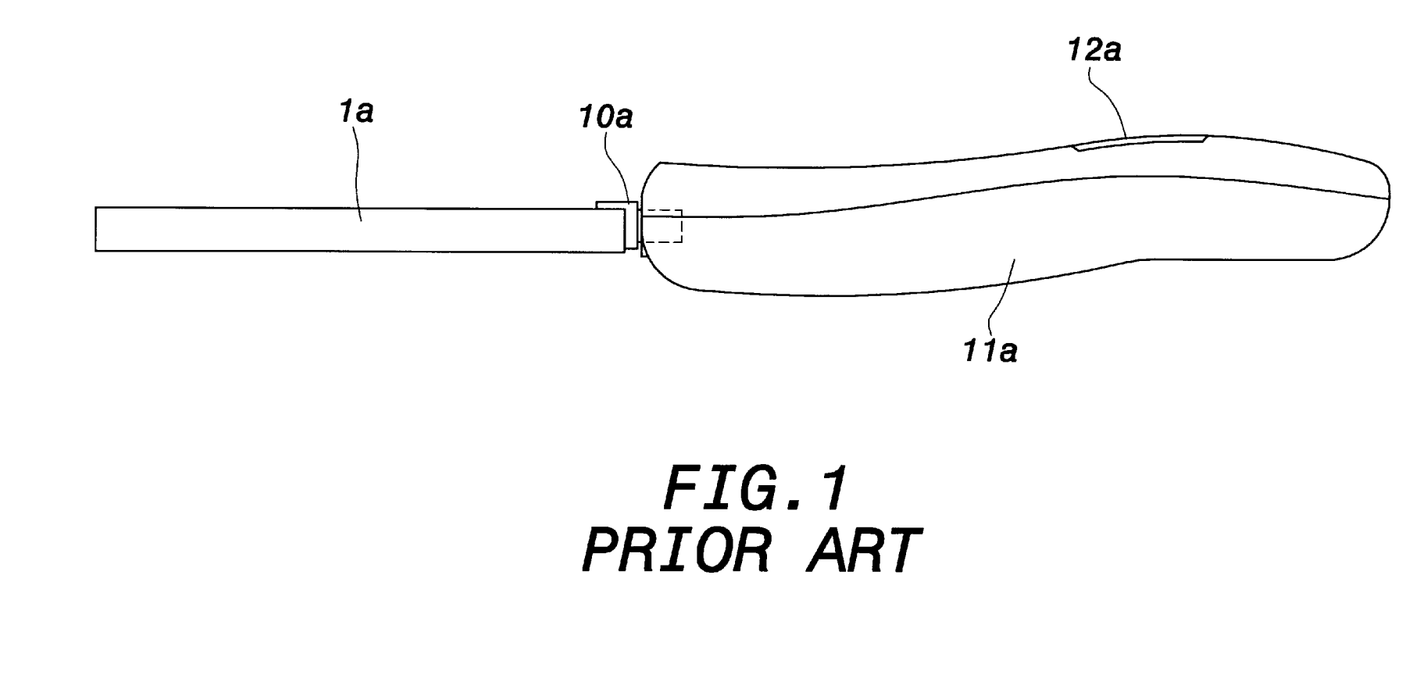
FIG. 1 shows a sectional view of a prior art keyboard for cellular phone.

FIG. 1 shows a sectional view of a prior art keyboard 1a for a cellular phone 11a. The keyboard 1a is electrically connected to the cellular phone 11a by an interface 10a. Moreover, the keyboard 1a is collinear with the cellulous phone 11a. Therefore, it is a problem for a user to view a display panel 12a on the cellular phone 11a while inputting data through the keyboard 1a.

The PDA generally has a foldable keyboard and the keyboard can be expanded to an inclined angle with respect to the PDA to facilitate viewing. However, the clamping of the keyboard to an inclined angle with respect to the

SUMMARY OF THE INVENTION

It is the object of the present invention to provide a keyboard assembly with a positioning function, whereby the keyboard can be advantageously positioned.

In a first aspect of the invention, the keyboard assembly has an interface with its vertical line inclined to its pivotal axis. The inclined angle is increased when the interface is rotated with respect to the inclined pivotal axis.

In a second aspect of the invention, the keyboard assembly has an interface with its vertical line inclined to its pivotal axis. When the interface is rotated with respect to the inclined pivotal axis, the keyboard can be advantageously positioned to expanded state.

According to the first aspect of the invention, the keyboard assembly comprises a keyboard body and an interface pivotally arranged on a pivotal axis of the keyboard body and being able to rotate laterally. The pivotal axis has an inclined angle with respect to a vertical line of the interface. After the interface is rotated to a clamping position with respect to the keyboard body, there is an included angle between the interface and the keyboard body, wherein the included angle is two times of the inclined angle.

According to the second aspect of the invention, the keyboard assembly comprises a keyboard body composed of a first panel and a second panel pivotally connected to the first panel. Each of the first panel and the second panel has a receiving space in symmetrical arrangement to accommodate the interface. The interface is rotated to the receiving space and the two panels of the keyboard body are prohibited from folding due to the interface.

The various objects and advantages of the present invention will be more readily understood from the following detailed description when read in conjunction with the appended drawing, in which:

DETAILED DESCRIPTION OF THE INVENTION

Figure 2:
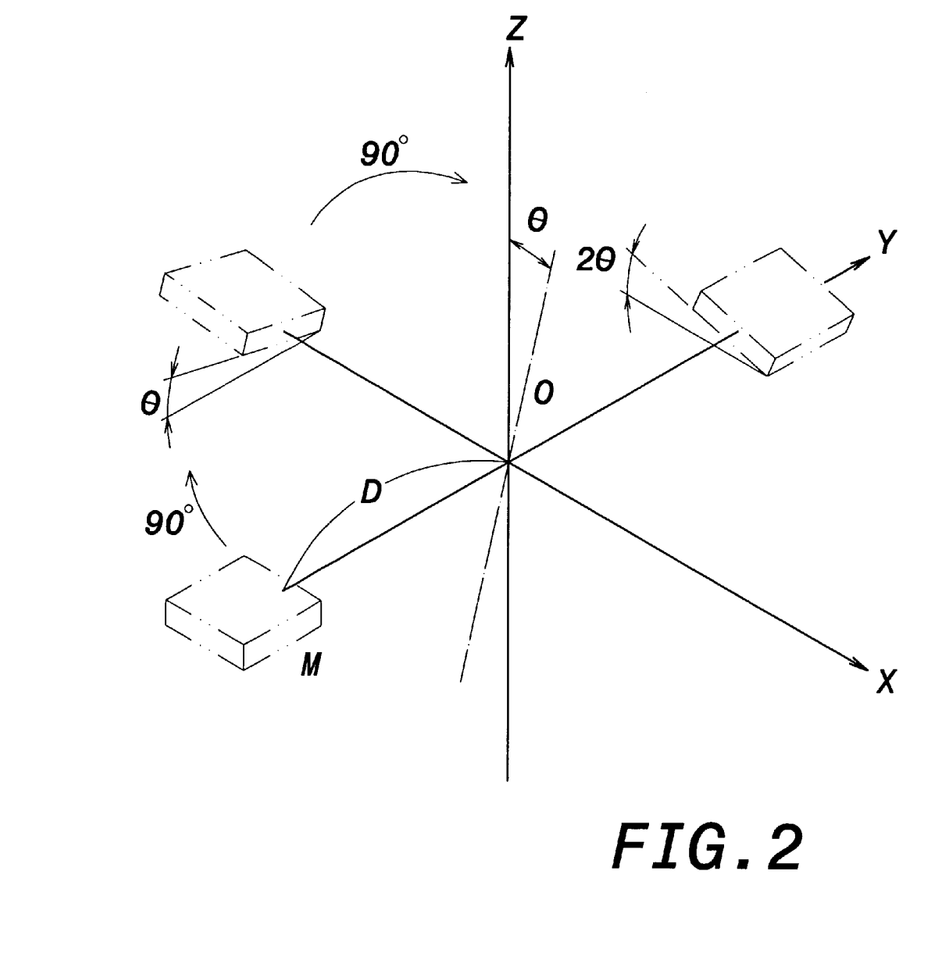
FIG. 2 demonstrates the basic principle of the present invention.

FIG. 2 demonstrates the basic principle of the present invention. As shown in this figure, an object M has an axis O of rotation. The axis O has an included angle θ with respect to the Z-axis of a reference coordinate. The object M initially lies on the X-Y plane of the reference coordinate. The object M has a distance D with respect to the axis O of rotation. If the object M is rotated in a clockwise direction with respect to the axis O by 90°, the object M will have an included angle θ with respect to the Z-axis. If the object M is further rotated in clockwise direction with respect to the axis O by 90°, the object M will have an included angle 2θ with respect to the Z-axis.

As can be seen from above description, if an object is rotated by 180° about an axis that slants with respect to the Z-axis of a reference coordinate system for the object, the object will have an included angle equal to two times of slanting angle with respect to the X-Y plane of the reference coordinate system.

Figure 3:
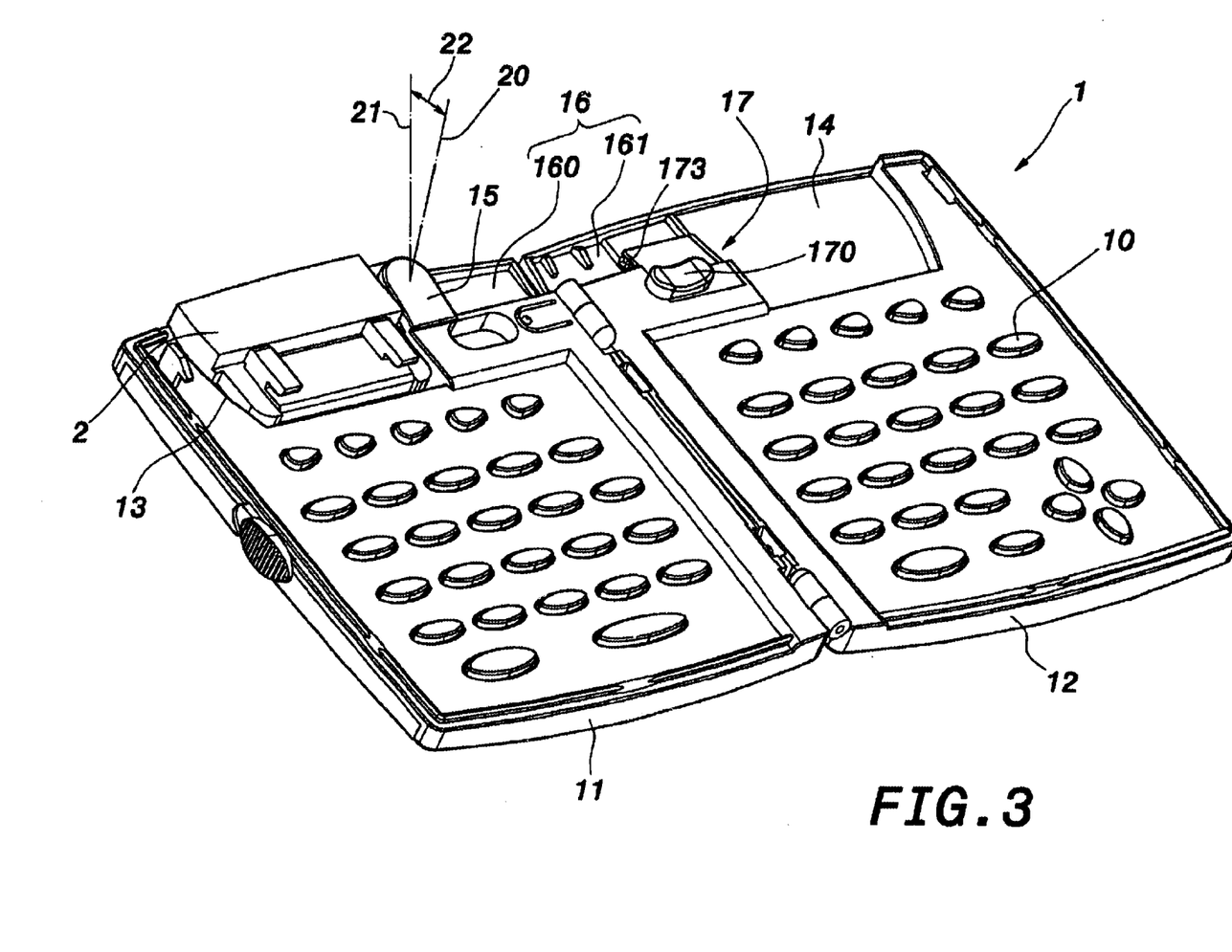
FIG. 3 shows a perspective view of the preferred embodiment of the present invention.
Figure 4:
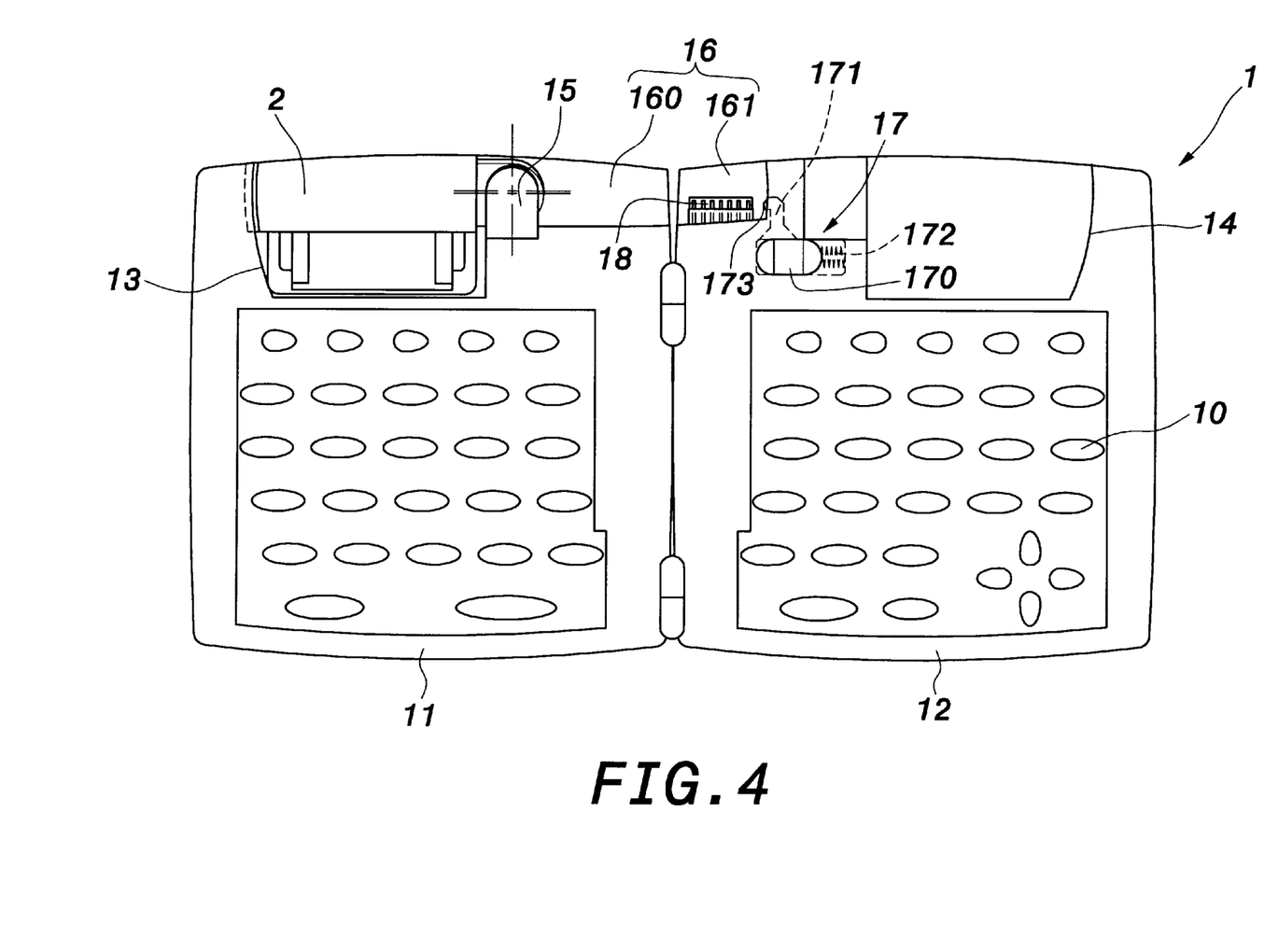
FIG. 4 shows a top view of the preferred embodiment of the present invention.

FIGS. 3 and 4 show a perspective view and a top view of the preferred embodiment of the present invention. The keyboard assembly according to the preferred embodiment of the present invention comprises a keyboard body 1 and an interface 2. The keyboard body 1 has a plurality of key-switches 10 thereon and is composed of a first panel 11 and a second panel 12. The first panel 11 has an adjacent side and the second panel 12 has an adjacent side pivotally connected to the adjacent side of the first panel 11, thus forming a foldable keyboard. The keyboard body 1 can be folded or expanded along the adjacent sides of the first panel 11 and the second panel 12. However, this is well-known art and a detailed description is not stated here.

The first panel 11 and the second panel 12 have a first receiving space 13 and a second receiving space 14, respectively. The first receiving space 13 and the second receiving space 14 are symmetrically arranged on a top portion of the keyboard body 1. The interface 2 is received in the first receiving space 13 and the second receiving space 14 when the first panel 11 and the second panel 12 are closed.

The first panel 11 has a pivotal section 15 near the first receiving space 13. More particularly, the first receiving space 13 is placed on one side of the pivotal section 15 and a positioning groove or recess 16 is formed on another side of the pivotal section 15. The positioning recess 16 is formed at the junction of the first panel 11 and the second panel 12 and is composed of two dents or concave portions 160, 161. The interface 2 is received in the positioning recess 16 when the first panel 11 and the second panel 12 are opened.

The second panel 12 has a clamping means 17 near the second receiving space 14. The clamping means 17 comprises a knob 170, a fastener 171 and an elastic section 172. The knob 170 is connected to the fastener 171 and the fastener 171 has a hook 173 extending beyond one side of the positioning recess 16. The knob 17 can be moved laterally by the elasticity of the elastic section 172, whereby the hook 173 can be locked on or detached from one side of the positioning recess 16.

Figure 7:
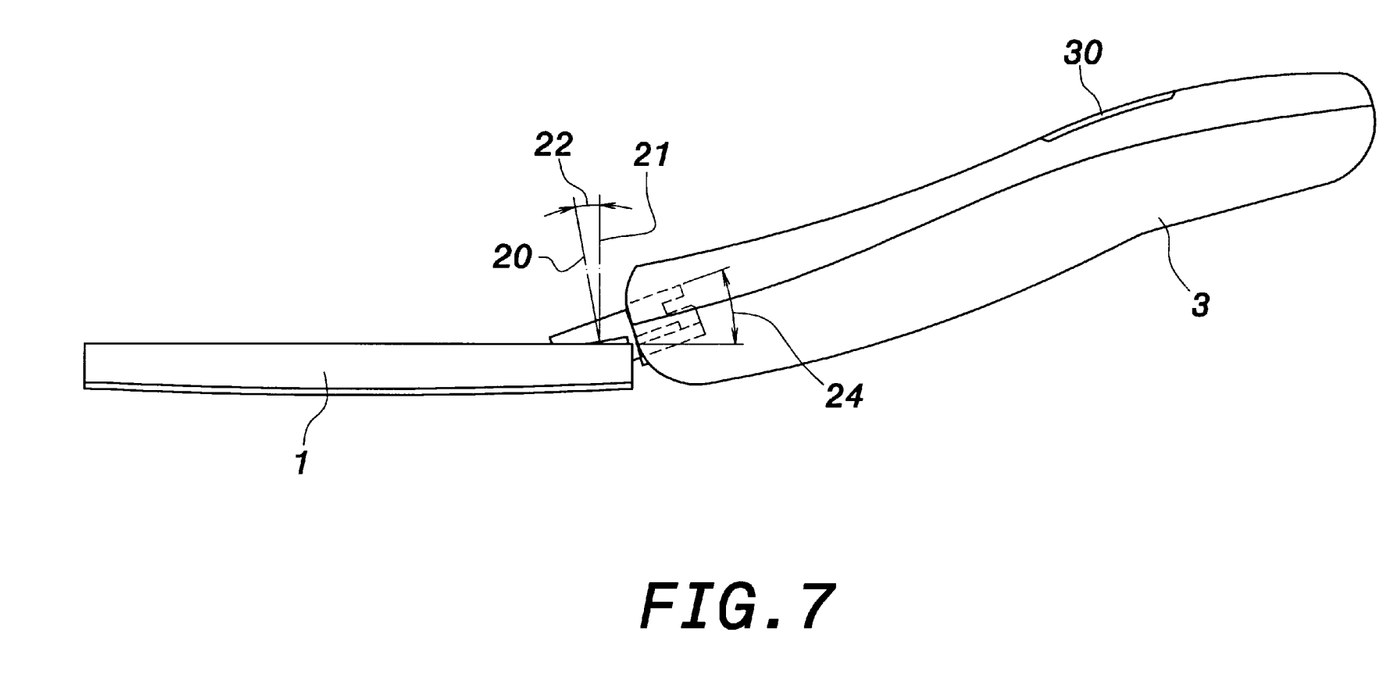
FIG. 7 shows a sectional view of the preferred embodiment of the present invention.

The interface 2 is electrically connected to a cellular phone 3 as shown in FIG. 7 or a PDA (not shown) and the commands or data input by the keyboard body 1 are sent to the cellular phone 3 or the PDA through the interface 2.

Figure 6:
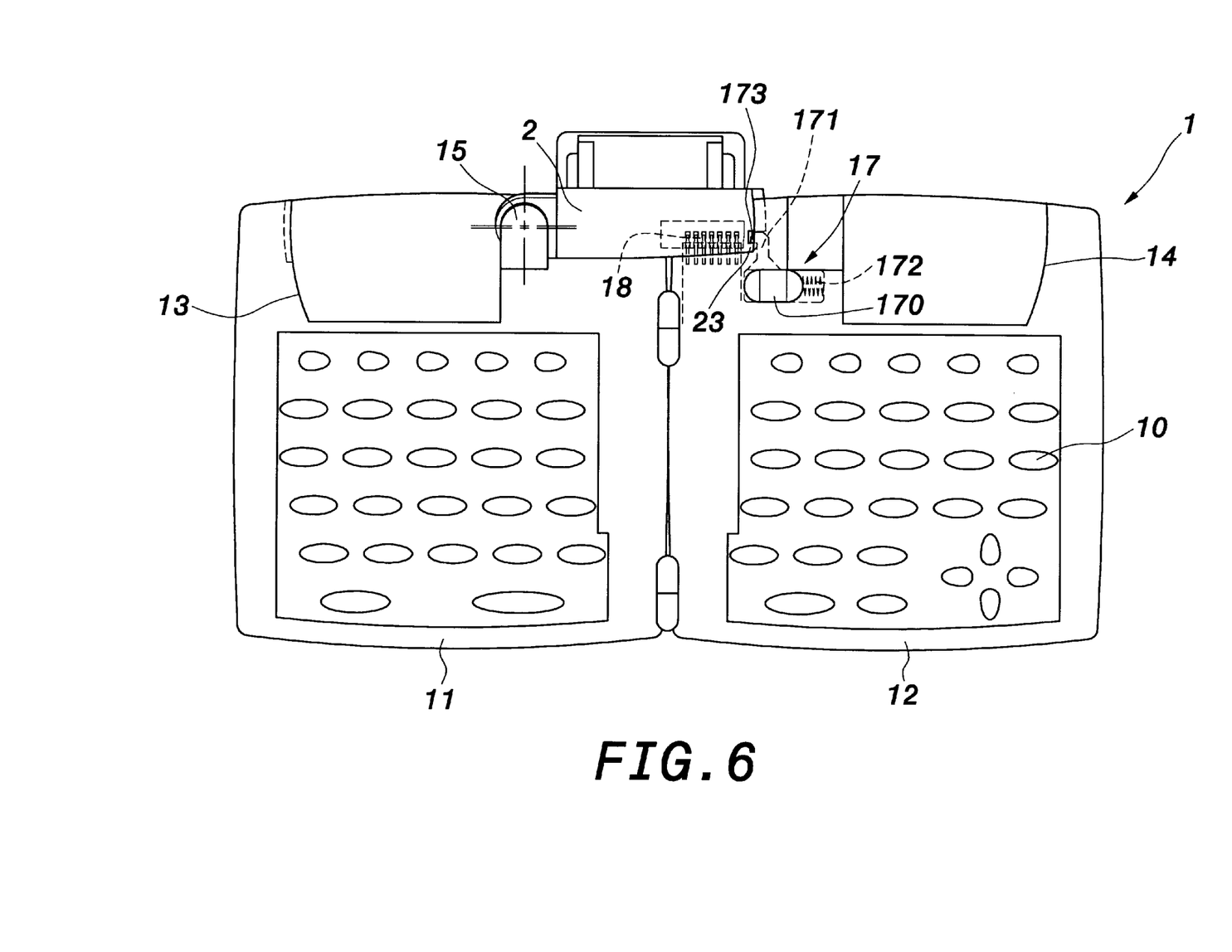
FIG. 6 shows a top view for demonstrating the usage of the preferred embodiment of the present invention.

The interface 2 is arranged in the first receiving space 13 and pivotally connected to the pivotal section 15 of the first panel 11 such that the interface 2 can be rotated leftward or rightward. The interface 2 can be rotated to the positioning recess 16 as shown in FIG. 6. The axis of the pivotal section 15 has an inclined angle 22 with respect to a perpendicular or vertical line 21 of the interface 2, wherein the inclined angle 22 is about 10 degrees. After the interface 2 is rotated to the positioning groove 16, the clamping means 17 is engaged with a clip 23 on one side of the interface 2 to clamp the interface 2.

Figure 5:
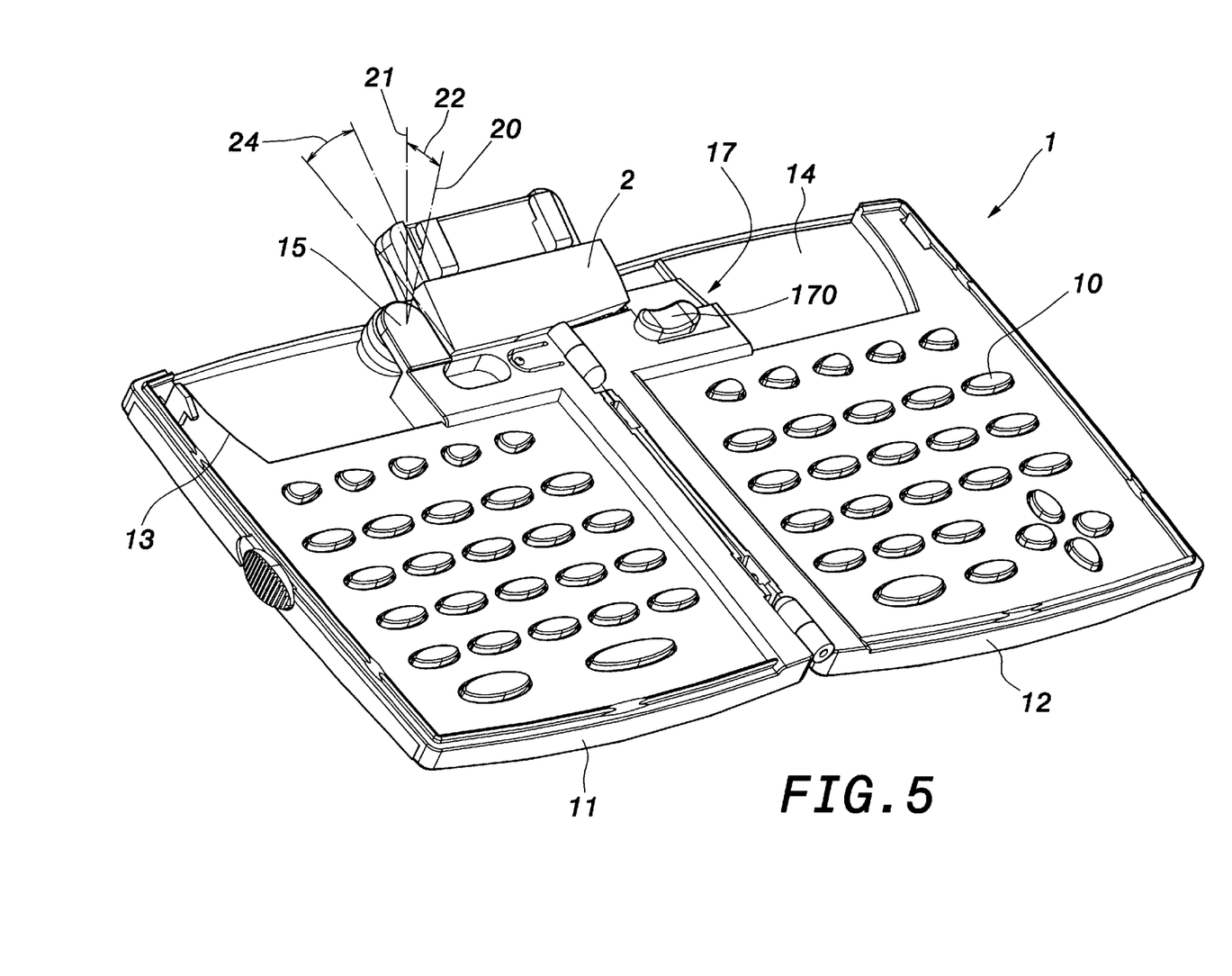
FIG. 5 shows a perspective view for demonstrating the usage of the preferred embodiment of the present invention.

FIGS. 5 and 6 show the perspective view and top view for demonstrating the usage of the preferred embodiment of the present invention. The pivotal axis of the pivotal section 15 has an inclined angle 22 with respect to a vertical line 21 of the interface 2 (the vertical line 21 is also vertical to the keyboard body 1). When the interface 2 is rotated 180 degrees to the positioning groove 16, there is an included angle 24 between the interface 2 and the keyboard body 1. And, the included angle 24 is two times of the inclined angle 22. Therefore, when the interface 2 is connected to a mobile device such as a cellular phone 3 or a PDA, the keyboard body 1 has an included angle 24 with respect to the mobile device to facilitate view of the display panel 30 of the cellular phone 3.

Moreover, after the interface 2 is rotated to the positioning recess 16, the interface 2 is placed at the junction of the two panels 11 and 12 of the keyboard body 1. At this time, the interface 2 is clamped by the clamping means 17 and the two panels 11 and 12 of the keyboard body 1 are prohibited from folding due to the interface 2. Therefore, by the present invention, the keyboard body 1 has an included angle 24 with respect to the mobile device to facilitate operation by a user and the two panels 11 and 12 of the keyboard body 1 are clamped in an open or expanded state.

Moreover, after the interface 2 is rotated to the positioning recess 16, the interface 2 is electrically connected to the keyboard body 1 through a connection unit 18 to transmit the command input from the keyboard body 1 to the interface 2. The command then is transmitted from the mobile device.

Figure 8:
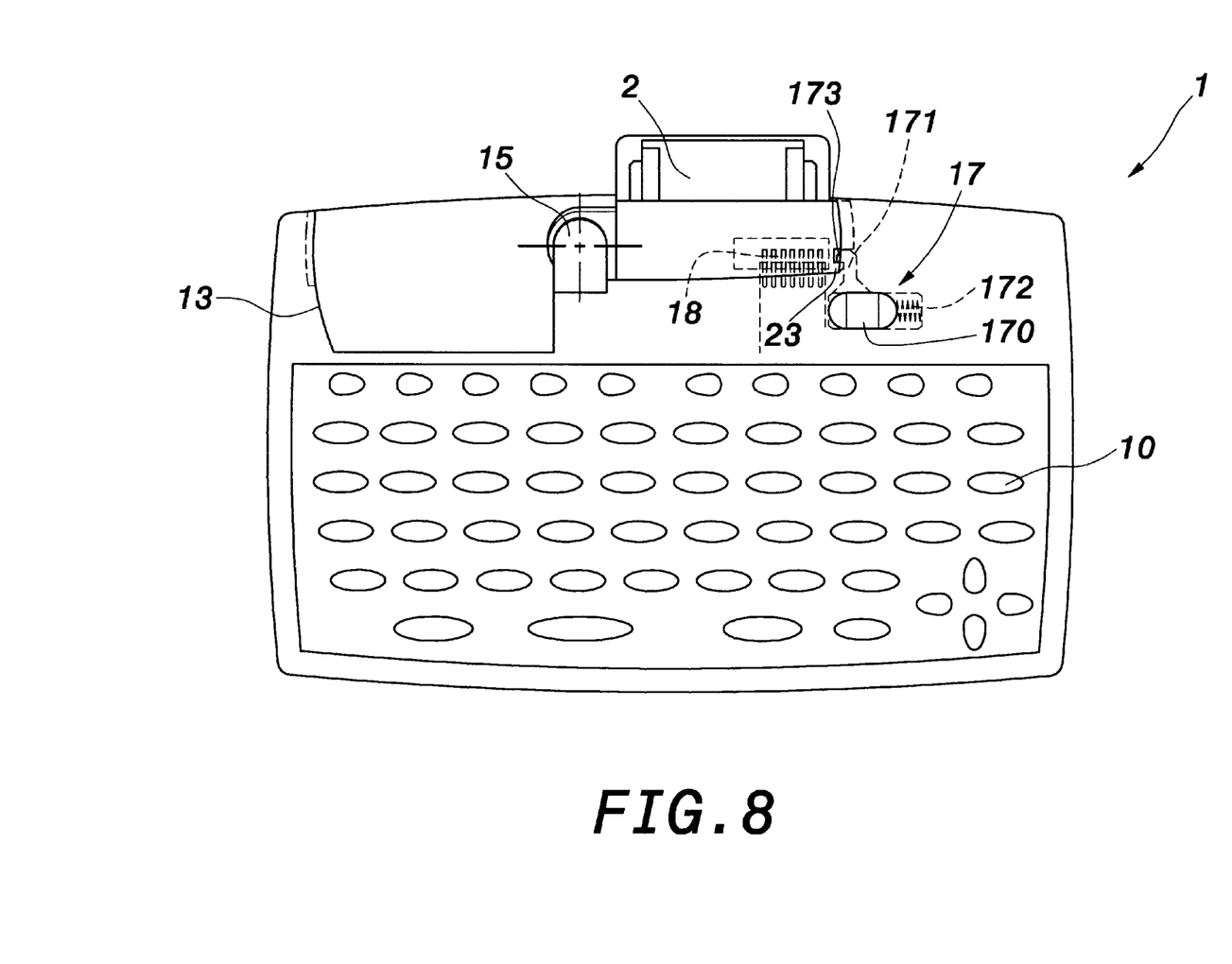
FIG. 8 shows a top view of another preferred embodiment of the present invention.

FIG. 8 shows a top view of another preferred embodiment of the present invention. The keyboard body 1 is an integrally formed one rather than a foldable one; therefore, the keyboard body 1 does not have clamping problem.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A keyboard assembly with a positioning function, comprising:

a keyboard body; and an interface pivotally arranged on the keyboard body and being able to rotate laterally about a pivotal axis, the pivotal axis having an inclined angle with respect to a line perpendicular to the interface, wherein, after the interface has been rotated 180 degrees with respect to the keyboard body, there is an included angle between the interface and the keyboard body, the included angle between the interface and the keyboard body being about two times the inclined angle of the pivotal axis.

2. The keyboard assembly with a positioning function as in claim 1, wherein the keyboard body is composed of a first panel and a second panel pivotally connected to the first panel.

3. The keyboard assembly with a positioning function as in claim 2, wherein each of the first panel and the second panel has a receiving space in a symmetrical arrangement to accommodate the interface.

4. The keyboard assembly with a positioning function as in claim 2, wherein a positioning recess is formed at a junction of the first panel and the second panel to accommodate the interface.

5. The keyboard assembly with a positioning function as in claim 1, wherein the keyboard body has a pivotal section on which the interface is pivotally arranged.

6. The keyboard assembly with a positioning function as in claim 1, wherein the keyboard body has a clamping means to clamp the interface.

7. The keyboard assembly with a positioning function as in claim 6, wherein the clamping means comprises a knob, a fastener and an elastic section.

8. A keyboard assembly with a positioning function, comprising:

a keyboard body including a receiving space and a positioning recess aligned with the receiving space;

an interface;

a first pivotal section disposed adjacent to the receiving space on the keyboard body;

a second pivotal section formed at one end of the interface and pivotally connected with the first pivotal section for movement about a pivotal axis;

a first inclined angle relative to a line perpendicular to the interface and the pivotal axis when the interface is positioned in the receiving space;

a second inclined angle relative to a surface of the interface and a surface of the keyboard body when the interface is positioned in the positioning recess, wherein the second inclined angle is about two times the first inclined angle.

9. The keyboard assembly with a positioning function as in claim 8, wherein the positioning recess is formed at a junction of the first panel and the second panel or arranged adjacent to the receiving space to accommodate the interface.

10. The keyboard assembly with a positioning function as in claim 8, wherein the keyboard body comprises first and second keyboard panels that are pivotally connected.

11. The keyboard assembly with positioning function as in claim 8, wherein the keyboard body has a clamping means to clamp the interface in the positioning recess.

* * * * *